United States Patent
Phillips et al.

(10) Patent No.: US 7,340,051 B2
(45) Date of Patent: Mar. 4, 2008

(54) POWER RAMP-UP IN A LINE-POWERED NETWORK ELEMENT SYSTEM

(75) Inventors: Melvin Richard Phillips, Youngsville, NC (US); Charles Weston Lomax, Jr., Raleigh, NC (US); Christopher Tad Ammann, Raleigh, NC (US)

(73) Assignee: ADC DSL Systems, Inc., Eden Prairie, MN (US)

( * ) Notice: Subject to any disclaimer, the term of this patent is extended or adjusted under 35 U.S.C. 154(b) by 458 days.

(21) Appl. No.: 10/449,547

(22) Filed: May 30, 2003

(65) Prior Publication Data

US 2004/0240665 A1    Dec. 2, 2004

(51) Int. Cl.
*H04M 1/00* (2006.01)
*H04M 9/00* (2006.01)

(52) U.S. Cl. ............... 379/413; 379/412; 307/44
(58) Field of Classification Search .................. 379/413.01–413.04, 413
See application file for complete search history.

(56) References Cited

U.S. PATENT DOCUMENTS

| | | | |
|---|---|---|---|
| 5,283,905 A | 2/1994 | Saadeh et al. | |
| 5,627,833 A | 5/1997 | Bliven | |
| 5,666,538 A | 9/1997 | DeNicola | |
| 5,694,398 A | 12/1997 | Doll et al. | |
| 5,774,689 A | 6/1998 | Curtis et al. | |
| 5,777,769 A * | 7/1998 | Coutinho | 398/171 |
| 5,818,125 A * | 10/1998 | Manchester | 307/66 |
| 5,990,575 A * | 11/1999 | Flaugher | 307/23 |
| 6,176,710 B1 | 1/2001 | Ewing et al. | |
| 6,208,670 B1 * | 3/2001 | Milliron et al. | 370/540 |
| 6,366,657 B1 | 4/2002 | Yagel et al. | |
| 6,546,089 B1 | 4/2003 | Chea, Jr. et al. | |
| 6,587,953 B1 | 7/2003 | Torikai | |
| 6,606,383 B1 * | 8/2003 | Robinson et al. | 379/413 |
| 6,643,566 B1 * | 11/2003 | Lehr et al. | 700/286 |
| 2001/0033502 A1 * | 10/2001 | Blair et al. | 363/65 |
| 2002/0002593 A1 | 1/2002 | Ewing et al. | |
| 2002/0039269 A1 * | 4/2002 | Kumagai et al. | 361/93.1 |
| 2002/0085325 A1 * | 7/2002 | Suzui et al. | 361/42 |
| 2002/0097546 A1 * | 7/2002 | Weinberger | 361/103 |
| 2003/0112573 A1 * | 6/2003 | Perez | 361/115 |
| 2003/0135773 A1 * | 7/2003 | Zhang et al. | 713/340 |
| 2003/0185385 A1 | 10/2003 | Boudreaux, Jr. et al. | |
| 2003/0221133 A1 * | 11/2003 | Nguyen et al. | 713/300 |

(Continued)

FOREIGN PATENT DOCUMENTS

WO    9320645    10/1993

(Continued)

*Primary Examiner*—Ramnandan Singh
(74) *Attorney, Agent, or Firm*—Fogg & Powers LLC (57) ABSTRACT

A method of ramping up a power supply that supplies power on a communication medium. The method includes supplying power on the communication medium with the power supply operating at a first set point, determining if an overload condition exists, and, if the overload condition does not exist, signaling a first alarm. If the overload condition exists, power is supplied on the communication medium with the power supply operating at a second set point. It is determined if the overload condition continues to exist while operating the power supply at the second set point. If the overload condition continues to exist while operating the power supply at the second set point, a second alarm is signaled.

31 Claims, 4 Drawing Sheets

U.S. PATENT DOCUMENTS

| | | | |
|---|---|---|---|
| 2004/0104707 A1* | 6/2004 | May et al. | 320/136 |
| 2004/0110483 A1* | 6/2004 | Mollenkopf | 455/402 |
| 2004/0196134 A1* | 10/2004 | Milanczak | 337/187 |
| 2005/0001607 A1* | 1/2005 | Berland et al. | 324/67 |
| 2005/0064914 A1* | 3/2005 | Gough | 455/567 |

FOREIGN PATENT DOCUMENTS

| | | |
|---|---|---|
| WO | 0036809 | 6/2000 |
| WO | 02067279 | 8/2002 |

* cited by examiner

POWER RAMP-UP IN A LINE-POWERED NETWORK ELEMENT SYSTEM

CROSS REFERENCE TO RELATED APPLICATIONS

This application is related to co-pending application Ser. No. 10/134,323, filed on Apr. 29, 2002 and entitled MANAGING POWER IN A LINE POWERED NETWORK ELEMENT (the '323 application). The '323 application is incorporated herein by reference.

This application is also related to the following applications filed on even date herewith, all of which are hereby incorporated herein by reference:

U.S. patent application Ser. No. 10/449,259 entitled "NETWORK ELEMENT IN A LINE POWERED NETWORK," (the '359 application);

U.S. patent application Ser. No. 10/449,682, entitled "ELEMENT MANAGEMENT SYSTEM IN A LINE POWERED NETWORK," (the '360 application);

U.S. patent application Ser. No. 10/449,546, entitled "SPLITTER," (the '592 application), issued as U.S. Pat. No. 6,998,964 on Feb. 14, 2006;

U.S. patent application Ser. No. 10/449,917, entitled "CURRENT SENSE CIRCUIT IN A LINE POWERED NETWORK ELEMENT," (the '589 application), issued as U.S. Pat. No. 7,113,591 on Sep. 26, 2006;

U.S. patent application Ser. No. 10/449,496, entitled "INPUT VOLTAGE SENSE CIRCUIT IN A LINE POWERED NETWORK ELEMENT," (the '590 application), issued as U.S. Pat. No. 6,967,585 on Nov. 22, 2005;

U.S. patent application Ser. No. 10/448,884, entitled "LIGHTNING PROTECTION FOR A NETWORK ELEMENT," (the '591 application), now abandoned; and U.S. patent application Ser. No. 10/449,910, entitled "FUNCTION FOR CONTROLLING LINE POWERED NETWORK ELEMENT, (the '358 application).

TECHNICAL FIELD

The present invention relates generally to the field of telecommunications, and, in particular, to managing line power for network elements in an access network.

BACKGROUND

Telecommunications networks transport signals between user equipment at diverse locations. A telecommunications network includes a number of components. For example, a telecommunications network typically includes a number of switching elements that provide selective routing of signals between network elements. Additionally, telecommunications networks include communication media, e.g., twisted pair, fiber optic cable, coaxial cable or the like that transport the signals between switches. Further, some telecommunications networks include access networks.

For purposes of this specification, the term access network means a portion of a telecommunication network, e.g., the public switched telephone network (PSTN), that allows subscriber equipment or devices to connect to a core network. For example, an access network is the cable plant and equipment normally located in a central office or outside plant cabinets that directly provides service interface to subscribers in a service area. The access network provides the interface between the subscriber service end points and the communication network that provides the given service. An access network typically includes a number of network elements. A network element is a facility or the equipment in the access network that provides the service interfaces for the provisioned telecommunication services. A network element may be a stand-alone device or may be distributed among a number of devices.

There are a number of conventional forms for access networks. For example, the digital loop carrier is an early form of access network. The conventional digital loop carrier transported signals to and from subscriber equipment using two network elements. At the core network side, a central office terminal is provided. The central office terminal is connected to the remote terminal over a high-speed digital link, e.g., a number of T1 lines or other appropriate high-speed digital transport medium. The remote terminal of the digital loop carrier typically connects to the subscriber over a conventional twisted pair drop.

The remote terminal of a digital loop carrier is often deployed deep in the customer service area. The remote terminal typically has line cards and other electronic circuits that need power to operate properly. In some applications, the remote terminal is powered locally. Unfortunately, to prevent failure of the remote terminal due to loss of local power, a local battery plant is typically used. This adds to the cost and complicates the maintainability of the remote terminal, due to the outside plant operational requirements which stipulate operation over extended temperature ranges.

In some networks, the remote terminal is fed power over a line from the central office. This is referred to as line feeding or line powering and can be accomplished through use of an AC or a DC source. Thus, if local power fails, the remote terminal still functions because it is typically powered over the line using a battery-backed power source. This allows the remote terminal to offer critical functions like lifeline plain old-fashioned telephone service (POTS) even during a power outage.

Over time, the variety of services offered over telecommunications networks has changed. Originally, the telecommunications networks were designed to carry narrowband, voice traffic. More recently, the networks have been modified to offer broadband services. These broadband services include services such as digital subscriber line (DSL) services. As time goes on, other broadband services will also be supported. These new services often come with increased power requirements.

As the service offerings have changed, the manner in which remote terminals are powered has not changed. The various services now offered are not all on equal footing. Data service today, unlike lifeline POTS, typically is not considered a necessity. Further, even among the other broadband services, there is a spectrum of variables affecting the level of service that a given subscriber wants and what the subscriber is willing to pay for it. Despite these changes in service offerings, the way that power is provided to the access equipment has not changed to keep pace with the service advancements.

Therefore, there is a need in the art for improvements in the manner in which power is provided to network elements in an access network.

SUMMARY

In one embodiment, a method of ramping up a power supply that supplies power on a communication medium includes supplying power on the communication medium with the power supply operating at a first set point. The method further includes determining if an overload condition exists. If the overload condition does not exist, a first alarm is signaled. If the overload condition exists, power is supplied on the communication medium with the power supply operating at a second set point. The method further includes determining if the overload condition continues to exist while supplying power on the communication medium with the power supply operating at the second set point. If the overload condition continues to exist while supplying power on the communication medium with the power supply operating at the second set point, a second alarm is signaled.

In another embodiment, a network element includes a communication interface that produces a telecommunication service signal that includes traffic for a communication link. The network element also includes a power interface adapted to couple the network element to a power source. The power interface includes a power supply that produces a power signal. The network element also includes a controller that controls the operation of the power supply, and a splitter that combines the telecommunication service signal with the power signal and applies the combined signal to the communication medium. The controller causes the power supply to supply power on the communication medium with the power supply operating at a first set point. The controller also determines if an overload condition exists. The controller also, if the overload condition does not exist, signals a first alarm. The controller also, if the overload condition exists, causes the power supply to supply power on the communication medium with the power supply operating at a second set point. The controller determines if the overload condition continues to exist while the power supply supplies power on the communication medium with the power supply operating at the second set point. The controller also, if the overload condition continues to exist while the power supply supplies power on the communication medium with the power supply operating at the second set point, signals a second alarm.

In another embodiment, a network element includes an interface adapted to couple the network element to a communication medium. The network element further includes a power supply adapted to couple the network element to a power source. Power is supplied on the communication medium with the power supply operating at a first set point. The network element determines if an overload condition exists. If the overload condition does not exist, the network element signals a first alarm. If the overload condition exists, the power supply supplies power on the communication medium with the power supply operating at a second set point. The network element determines if the overload condition continues to exist while the power supply supplies power on the communication medium with the power supply operating at the second set point. If the overload condition continues to exist while the power supply supplies power on the communication medium with the power supply operating at the second set point, the network element signals a second alarm.

In another embodiment, a network includes a source network element including a power supply coupled to a power source and a sink network element coupled to the source network element over a communication medium. Power is supplied on the communication medium to power the sink network element with the power supply operating at a first set point. The network element determines if an overload condition exists. If the overload condition does not exist, the network element signals a first alarm. If the overload condition exists, the power supply supplies power on the communication medium to power the sink network element with the power supply operating at a second set point. The network element determines if the overload condition continues to exist while the power supply supplies power on the communication medium to power the sink network element with the power supply operating at the second set point. If the overload condition continues to exist while the power supply supplies power on the communication medium to power the sink network element with the power supply operating at the second set point, the network element signals a second alarm.

DETAILED DESCRIPTION

Figure 1:
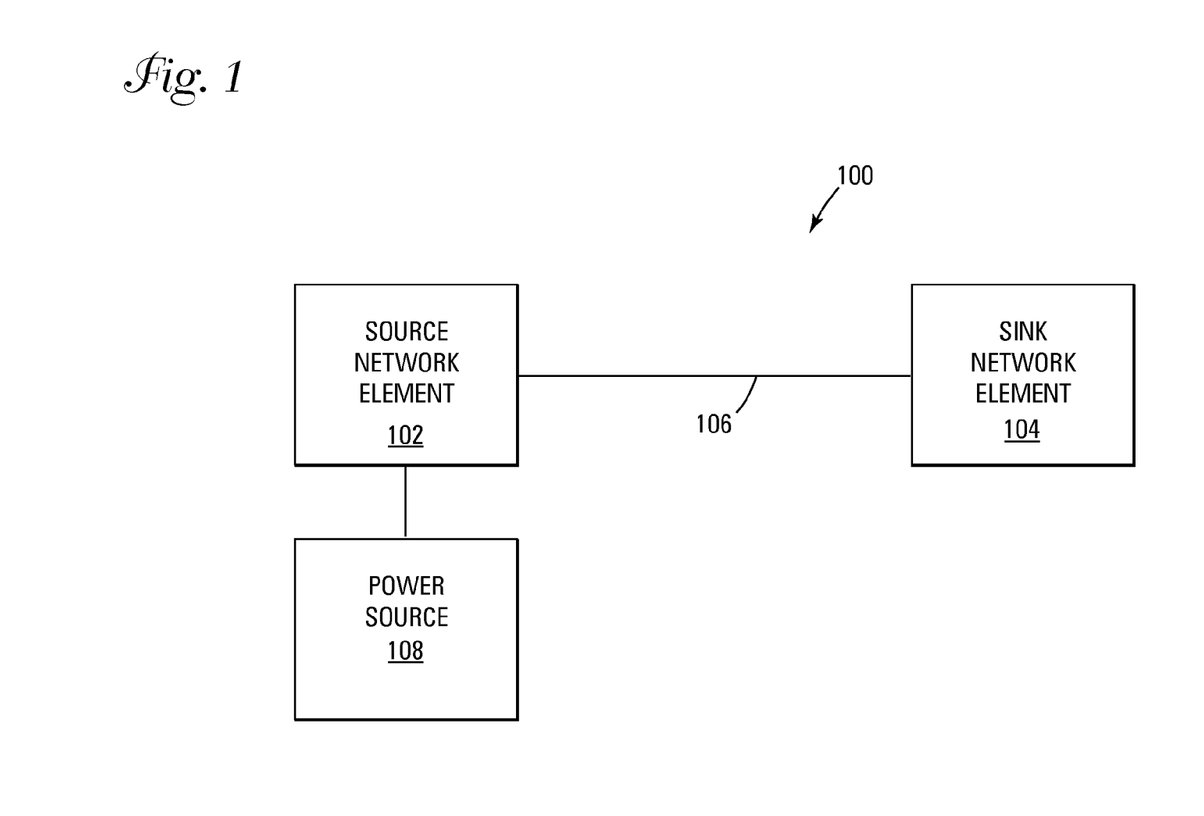
FIG. 1 is block diagram of one embodiment of network that includes at least one line-powered network element.

FIG. 1 is block diagram of one embodiment of network 100 that includes at least one line-powered network element. Network 100 includes at least one network element 102 (referred to here as a "source network element") that provides power to at least one other network element 104 (referred to here as a "sink network element") over a communication medium 106 (referred to here as a "power communication medium"). In the one embodiment, the source network element 102 is a central office terminal located in central office of a service provider and the sink network element 104 is a remote terminal located in the outside plant, for example, in an environmentally hardened enclosure. In such an embodiment, both the central office terminal 102 and the remote terminal 104 are included in an access network that couples one or more items of customer located equipment (for example, a modem, wireless access point, or telephone set) to a communications network such as the Internet or public switched telephone network (PSTN). The central office terminal provides power to the remote terminal over at least one twisted-pair telephone line. That is, in such embodiment, the twisted-pair telephone line is the power communication medium 106.

The source network element 102 is coupled to a power source 108 in order to obtain power that is used to power the source network element 102 and to provide power to the sink network element 104 over the power communication medium 106. In one embodiment, the power source 108 includes a direct current (DC) and/or an alternating current (AC) power source such as a battery and/or a connection the main power grid. In other embodiments, other powers sources are used.

The source network element 102 and the sink network element 104 communicate with one another using some type of communication link. For example, in one embodiment, a central office terminal and a remote terminal communicate over a DSL communication link provided between the central office terminal and the remote terminal. Examples of DSL communication links includes a high-bit rate DSL (HDSL) link, high-bit rate digital subscriber line 2 (HDSL2) link, high-bit rate digital subscriber line 4 (HDSL4) link, asymmetric digital subscriber line (ADSL), or symmetric DSL link conforming to the International Telecommunication Union (ITU) standard G.991.2 (a G.SHDSL link). In other embodiments, other types of communication links are used.

In the embodiment shown in FIG. 1, the communication link is provided on the same communication medium that is used to supply power from the source network element 102 to the source network element 104. In other embodiments, a separate communication medium is used to provide such a communication link between the source network element 102 and the sink network element 104.

Both the source network element 102 and the sink network element 104 are typically coupled to other network elements. For example, in one embodiment, the source network element 102 is coupled to an upstream network element such as a switch and the sink network element 104 is coupled to one or more downstream network elements such as various items of customer located equipment (for example, a modem, wireless access point, or telephone set).

Figure 2:
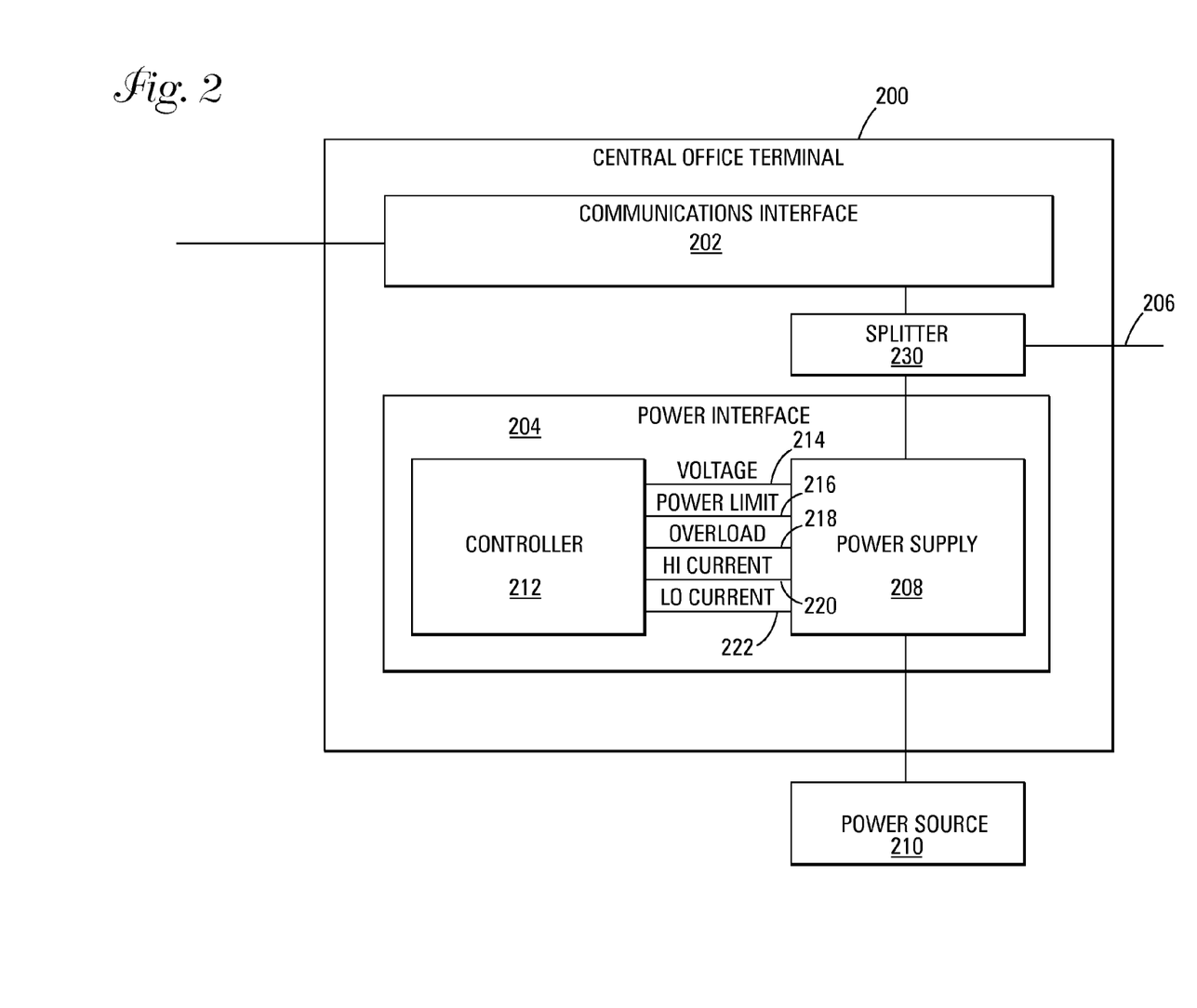
FIG. 2 is a block diagram of one embodiment of a central office terminal.

FIG. 2 is a block diagram of one embodiment of a central office terminal 200. Embodiments of central office terminal 200 are suitable for providing power to one or more remote terminals (or other network elements) over one or more twisted-pair telephone lines (or other communication medium). The embodiment of a central office terminal 200 shown in FIG. 2 includes communication interface 202 and a power interface 204. The communication interface 202 includes appropriate components for providing the various telecommunications service provided by the central office terminal 200. For example, in the embodiment shown in FIG. 1, the communications interface 202 couples the central office terminal 200 to at least one upstream G.SHDSL communication link and to at least one downstream G.SHDSL communication link (via a splitter 230 described below). The downstream G.SHDSL communication links is provided over at least one twisted-pair telephone line 206. The twisted-pair telephone line 206 is coupled, in one embodiment to one or more remote terminals (not shown in FIG. 2) that are powered by the central office terminal 200.

The power interface 204 includes a power supply 208 that is coupled to a power source 210. In general, the power supply 208 receives power from the power source 210 and conditions and supplies power on the twisted-pair telephone lines 206 in order to power a remote terminal coupled to the twisted-pair telephone line 206. In one such embodiment, the power supply 208 is implemented as a fly-back power supply. The central office terminal 200 includes a splitter 230 that combines an output communication signal from the communications interface 202 and an output power signal from the power interface 204 and applies the combined output signal to the twisted-pair telephone line 206. The splitter 230 also receives an input signal from the twisted-pair telephone line 206 and splits off that portion of the received input signal used for providing the downstream communication link and provides it to the communications interface 202 for appropriate processing. One embodiment of a splitter 230 is described in the '592 application.

The power interface 204 also includes a controller 212 that controls the operation of the power supply 208. In one such embodiment, controller 212 is implemented in hardware (for example, using analog and/or digital circuits) and/or in software (for example, by programming a programmable processor with appropriate instructions to carry out the various control functions described here). In other embodiments, the controller 212 is implemented in other ways. Although the controller 212 is shown as being a part of the power interface 204 in FIG. 2, in other embodiments the controller 212 is a part of a general controller or control circuitry for the central office terminal 200. In other embodiments, the functions performed by the controller 212 are incorporated directly into control circuitry of the power supply 208.

In the embodiment shown in FIG. 2, a voltage signal 214 is provided between the controller 212 and the power supply 208. The voltage signal 214 is used by the controller 212 to set a nominal voltage at which the power supply 208 is to supply power on the twisted-pair telephone line 206 in order to power a remote terminal coupled to the twisted-pair telephone line 206. A power limit signal 216 is provided between the controller 212 and the power supply 208. The power limit signal 216 is used by the controller 212 to set a power limit for the power supply 208. The power limit is a maximum power the power supply 208 is to provide on the twisted-pair telephone line 206.

An overload signal 218 is provided by the power supply 208 to the controller 212. The overload signal 218 is used by the power supply 208 to inform the controller 212 that the power supply 208 is currently supplying power with an output voltage that is below the nominal voltage specified on the voltage signal 214. This is referred to here as an "overload condition" or that the power supply 208 is "out of regulation." For example, when a remote terminal coupled to the twisted-pair telephone line 206 draws an amount of current that causes the amount of power supplied by the power supply 208 to exceed the power limit specified by the power limit signal 216, the power supply 208 drops the output voltage so that the total power supplied by the power supply 208 does not exceed the power limit. When an overload condition exists, the power supply 208 indicates that such an overload condition exists on the overload signal 218.

In the embodiment shown in FIG. 2, various current measurement signals are supplied by the power supply 208 to the controller 212. For example, a low current signal 220 is supplied by the power supply 208 to the controller 212 to indicate that the current currently supplied by the power supply 208 is below some relatively low threshold current value. A high current signal 222 is supplied by the power supply 208 to controller 212 to indicate that the current currently supplied by the power supply 208 is above some relatively high current value. In other embodiments, the amount of current currently supplied by the power supply 208 is measured and provided to the controller 212.

Figure 3:
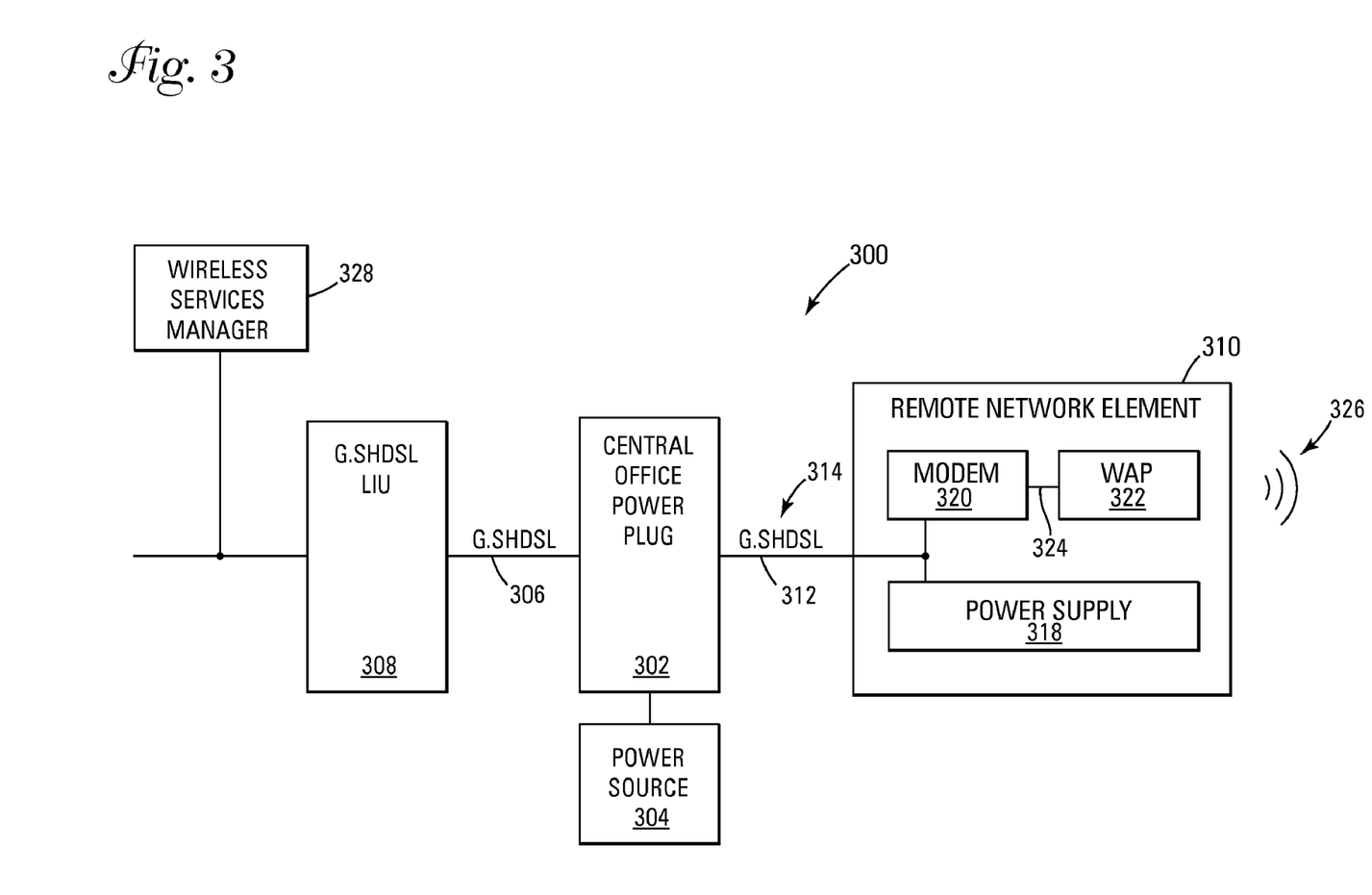
FIG. 3 is a block diagram of one embodiment of a wireless network.

FIG. 3 is a block diagram of one embodiment of a wireless network 300. The embodiment of a wireless network 300 shown in FIG. 3 includes a central office power plug 302 that is coupled to a power source 304. In one embodiment, central office power plug 302 is implemented using an embodiment of the central office terminal 200 described above. An upstream G.SHDSL communication link 306 is provided to the central office power plug 302 over an upstream communication medium (for example, a twisted-pair telephone line). The upstream G.SHDSL communication link 306 couples the central office power plug 302 to a G.SHDSL line interface unit 308. The G.SHDSL line interface unit 308 is coupled to an upstream network (not shown) such as the Internet. In one such embodiment, the G.SHDSL line interface units 308 is inserted into a subscriber access multiplexer (not shown) in order to couple the G.SHDSL line interface unit 308 to the upstream network.

The wireless network 300 also includes a remote network element 310. Remote network element 310 is powered by a twisted-pair telephone line 312 that is coupled between the central office power plug 302 and the remote network element 310. A downstream G.SHDSL communication link 314 is provided over the twisted-pair telephone line 312. The central office power plug 302 supplies power for the remote network element 310 on the twisted-pair telephone line 312 in the same manner as described above in connection with FIG. 2. The remote network element 310 includes a power supply 318 that is coupled to the twisted-pair telephone line 312. The power supply 318 extracts the power supplied on the twisted-pair telephone line 312 by the central office power plug 302. The extracted power is used to power various components of the remote network element 310.

The remote network element 310 also includes a G.SHDSL modem 320 that modulates and demodulates the G.SHDSL signals carried over the twisted-pair telephone line 312. The modem 320 is coupled to a wireless access point 322 over an Ethernet connection 324. The wireless access point 322 transmits traffic to, and receives traffic from various wireless devices (not shown) over a wireless link 326. Examples of wireless devices include computers or personal digital assistants having wireless transceivers. In one embodiment, the wireless access point 322 is a wireless access point that supports the Institute for Electrical and Electronic Engineers (IEEE) 802.11b standard (also referred to as "WI-FI").

The wireless network 300 also includes a wireless services manager 328 that manages the wireless services provided over the wireless network 300. For example, in one embodiment, wireless services manager 328 manages authentication and other subscriber and service-related information using the Remote Authentication Dial-in User Service (RADIUS) protocol. In one embodiment, the wireless services manager 328 is coupled to the G.SHDSL line interface unit 308 using a local area network connection (for example, an Ethernet connection).

In operation, wireless traffic is received by the wireless access point 322 from various wireless devices. The wireless traffic is transmitted to the central office power plug 302 by the G.SHDSL modem 320 over the twisted-pair telephone line 312. A splitter (not shown in FIG. 3) splits off that portion of the signal used for providing the G.SHDSL communication link and provides it to a communications interface (not shown in FIG. 3) of the central office power plug 302 for appropriate processing. The communications interface transmits the traffic to the G.SHDSL line interface unit 308 over the upstream G.SHDSL communication link 306, where the traffic is processed and forwarded to the upstream network by the line interface unit 308. In the downstream direction, traffic is received by the G.SHDSL line interface unit 308 from the upstream network. The traffic is transmitted to the central office power plug 302 over the upstream communication link 306. The traffic is combined with power from a power supply (not shown in FIG. 3) of the central office power plug 302 by the splitter and the combined signal is transmitted on the twisted-pair telephone line 312. The signal is received by the G.SHDSL modem 320, which forwards the traffic to the wireless access point 322 for transmission to the wireless devices.

Figure 4:
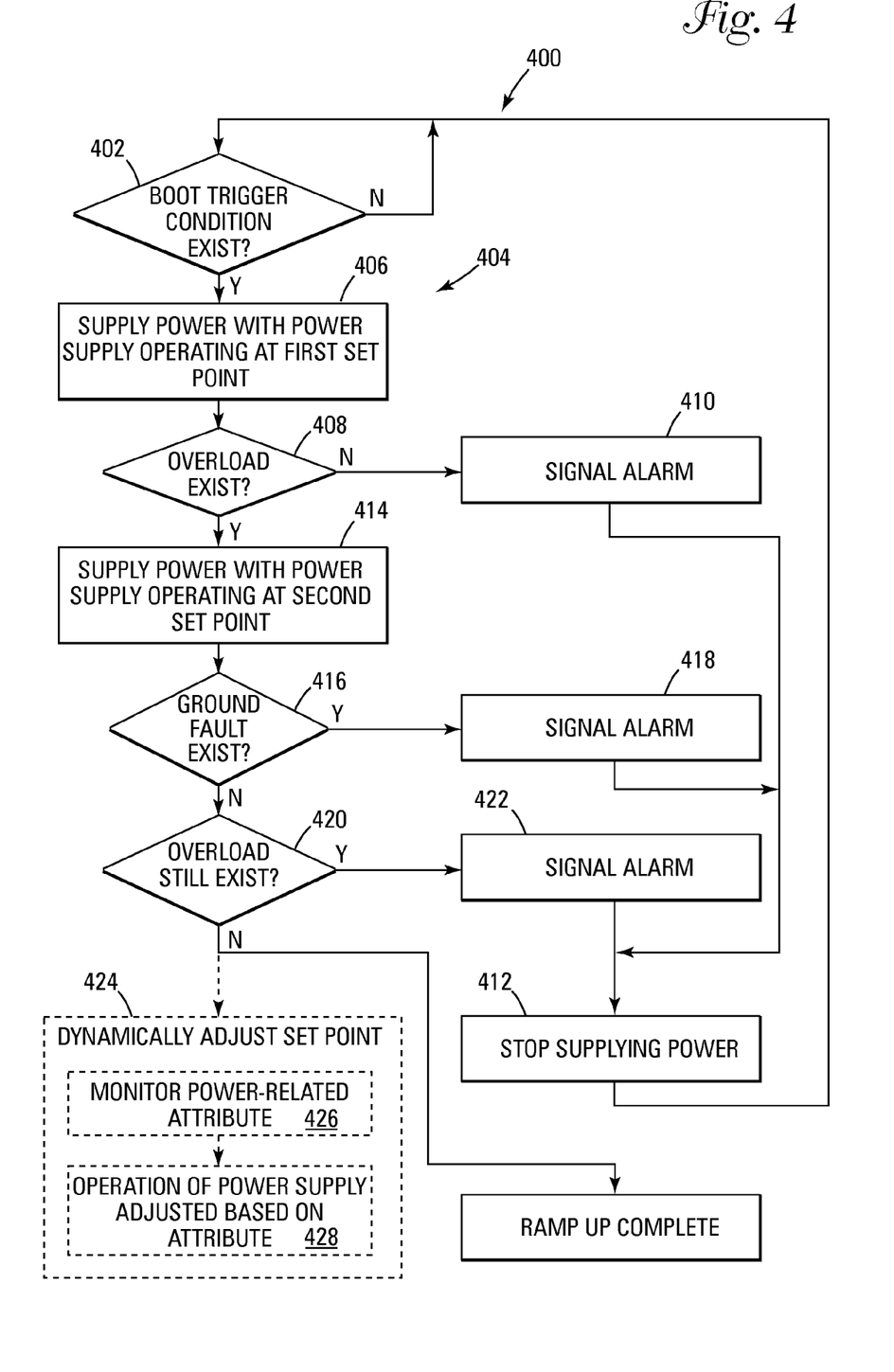
FIG. 4 is flow diagram of one embodiment of a method of ramping up power in a network including line-powered network elements.

FIG. 4 is flow diagram of one embodiment of a method 400 of ramping up power in a network including line-powered network elements. Embodiments of method 400 are suitable for use with source network elements and sink network elements described here. An embodiment of method 400 implemented using the central office terminal 200 of FIG. 2 is shown in FIG. 4. In one such embodiment, the functionality of method 400 is implemented using an embodiment of controller 212. Other embodiments of method 400 are implemented using other types of source network elements.

Method 400 includes determining if a boot trigger condition exists (block 402). If a boot trigger condition exists, a power ramp-up process 404 described below is executed. In one embodiment, the power supply 208 of the central office terminal 200 can be instructed to stop supplying power on the twisted-pair telephone line 206 by shorting the ring and tip lines of twisted-pair telephone line 206 together or by applying a low voltage across the ring and tip lines. When such a short is detected, the power supply 208 stops supplying power on the twisted-pair telephone line 206. Then, the power supply 208 can be instructed to initiate the power ramp-up process 404 by removing the short (or low voltage) between the ring and tip lines. This can be done by a field technician that is, for example, installing or servicing a remote terminal coupled to the twisted-pair telephone line 206.

In another embodiment, controller 212 periodically invokes the power ramp-up process 404. In such an embodiment, a timer or similar device is used to determine when a predetermined period has elapsed since the power supply 208 last invoked the power ramp-up process 404 and/or stopped supplying power to the remote terminal. The boot trigger condition is such an embodiment is that the predetermined period of time has elapsed.

The power ramp-up process 404 includes supplying power on the communication medium (that is, the twisted-pair telephone line in the embodiment discussed here) with the power supply 208 operating at a first set point (block 406). As used here, set point refers to a particular setting of the nominal voltage and power limit of the power supply 208. In one embodiment, operating the power supply 208 at the first set point includes ramping up the nominal voltage of the power supply 208 to a first voltage value and ramping up the power limit of the power supply 208 to a first power limit value. The rate at which the nominal voltage and the power limit are ramped up is selected to so as to avoid creating (or reduce the occurrence of) transients on the twisted-pair telephone line 206 that might harm devices coupled to the twisted-pair telephone line 206. In another embodiment, the nominal voltage of the power supply 208 is set to the first voltage value and the power limit of the power supply 208 is set to first power limit value. Then, the power supply is operated at the first set point without any ramping.

The first voltage value and the first power limit value are selected so that enough power is supplied on the twisted-pair telephone line 206 to start up a remote terminal but not enough power is supplied to operate the remote terminal normally. That is, the remote terminal is provided with enough power so that the remote terminal will boot its power supply. However, the remote terminal is not provided with enough power to operate the remote terminal normally at full speed. In one embodiment, the first voltage and first power limit are selected so that the power supply 208 supplies one half of the amount of power supplied to the remote terminal during normal, full-speed operation. In one embodiment, the controller 212 sets the nominal voltage and the power limit of the power supply 208 using the voltage signal 214 and the power limit signal 216, respectively.

Then, whether or not an overload condition has occurred is checked (block 408). For example, in one embodiment, an overload condition is detected when the overload signal 218 is asserted by the power supply 208. If a remote terminal is coupled to the twisted-pair telephone line 206 and successfully starts up, the remote terminal will attempt to draw the full amount of power needed to operate the remote terminal normally at full speed. This will cause an overload condition to occur in the power supply 208. If an overload condition does not occur (for example, does not occur within a specified period of time), an alarm is signaled (block 410). If an overload condition does not occur within a specified period of time after starting the power ramp-up process 404, then some type of fault exists, for example, there is no remote terminal coupled to the twisted-pair telephone line, there is an open circuit in the twisted-pair telephone line, or a twisted-pair telephone line is coupled to the twisted-pair telephone line but is not operational. In one embodiment, the alarm indicates that no sink network element was detected on the communication medium. In the embodiment shown in FIG. 4, the power supply 208 stops supplying power on the communication medium when an overload condition does not occur (block 412). Method 400 is then restarted.

If an overload condition is detected, then the power supply 208 supplies power on the communication medium (that is, the twisted-pair telephone line in the embodiment discussed here) with the power supply 208 operating at a second set point (block 414). In one embodiment, operating the power supply 208 at the second set point includes ramping up the nominal voltage of the power supply 208 to a second voltage value and ramping up the power limit of the power supply 208 to a second power limit value. The rate at which the nominal voltage and the power limit are ramped up is selected to so as to avoid creating (or reduce the occurrence of) transients on the twisted-pair telephone line 206 that might harm devices coupled to the twisted-pair telephone line 206. In another embodiment, the nominal voltage of the power supply 208 is set to the second voltage value and the power limit of the power supply 208 is set to second power limit value. Then, the power supply is operated at the second set point without any ramping. In one embodiment, the second set point is selected so as to provide the amount of power needed to operate a remote terminal coupled to the twisted-pair telephone line 206 in a normal manner at full speed.

In the embodiment shown in FIG. 4, while the power supply is ramped up (or otherwise increased) from the first set point to the second set point, it is determined if a ground fault exists on the communication medium (block 416). If a ground fault exists, an alarm is signaled (block 418) and the power supply 208 stops supplying power on the communication medium (block 412). The alarm that is signaled indicates that a ground fault exists. Method 400 is then restarted.

Then, whether or not the overload condition continues to exist while operating the power supply 208 at the second set point is checked (block 420). If the overload condition continues to exist (for example, a specified period of time has elapsed since the power supply 208 started operating at the second set point), an alarm is signaled (block 422). If the overload condition continues to exist while the power supply 208 is operated at the second set point, then some type of fault exists, for example, there is short circuit in the twisted-pair telephone line 206 and/or the remote terminal coupled to the twisted-pair telephone line 206. In one embodiment, the alarm that is signaled indicates that something other than a valid sink network element was detected on the communication medium. In the embodiment shown in FIG. 3, the power supply 208 stops supplying power on the communication medium if the overload condition continues to exists while the power supply 208 supplies power on the communication medium with the power supply 208 operating at the second set point (block 412). Method 400 is then restarted.

If the overload condition does not continue to exist while operating the power supply 208 at the second set point, then the power ramp-up process 404 is complete. In an alternative embodiment (shown in FIG. 4 using dashed lines), the set point at which the power supply 208 is operated is adjusted dynamically to operate the power supply 208 at a final set point (block 424). For example, in the embodiment shown in FIG. 4, a power-related attribute is monitored (block 426) and the operation of the power supply 208 is adjusted based on the monitored power-related attribute (block 428). For example, in one embodiment the amount of current and/or the amount of power supplied by the power supply 208 is monitored and the nominal voltage at which the power supply 208 is operated is increased or decreased based on current and/or power. In one embodiment, the power-related attribute is monitored to determine how far away the remote terminal is from the central office terminal 200. This allows the amount of power supplied by the power supply 208 on the twisted-pair telephone line 206 to be adjusted based on how far the remote terminal is from the central office terminal 200. For example, if the remote terminal is relatively close to the central office terminal 200, the amount of power supplied by the power supply 208 on the twisted-pair telephone line 206 is reduced. If the remote terminal is relatively far from the central office terminal 200, the amount of power supplied by the power supply 208 on the twisted-pair telephone line 206 is increased. In other embodiments, other adjustments are made.

Although the embodiments of method 400 are described here as sequential steps, this functionality can be implemented in many ways. For example, the functionality can be implemented in analog and/or digital electronic circuitry, or with a programmable processor (for example, a special-purpose processor or a general-purpose process such as a computer), firmware, software, or in combinations of them. In one embodiment, apparatus embodying these techniques include appropriate input and output devices, a programmable processor, and a storage medium tangibly embodying program instructions for execution by the programmable processor. In one embodiment, a process embodying these techniques are performed by a programmable processor executing a program of instructions to perform desired functions by operating on input data and generating appropriate output. In one embodiment, the techniques advantageously are implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed application-specific integrated circuits (ASICs).

A number of embodiments of the invention defined by the following claims have been described. Nevertheless, it will be understood that various modifications to the described embodiments may be made without departing from the scope of the claimed invention. Accordingly, other embodiments are within the scope of the following claims.

What is claimed is:

1. A method of ramping up a power supply that supplies power on a communication medium, the method comprising:
   supplying power on the communication medium with the power supply operating at a first set point;
   determining if an overload condition exists while supplying power on the communication medium with the power supply operating at the first set point;
   if the overload condition does not exist, signaling a first alarm;
   if the overload condition exists:
      supplying power on the communication medium with the power supply operating at a second set point;
      determining if the overload condition continues to exist while supplying power on the communication medium with the power supply operating at the second set point; and
      if the overload condition continues to exist while supplying power on the communication medium with the power supply operating at the second set point, signaling a second alarm.

2. The method of claim 1, further comprising determining if a boot trigger condition exists and wherein power is supplied on the communication medium with the power supply operating at the first set point when the boot trigger condition exists.

3. The method of claim 2, wherein the boot trigger condition is a short circuit on the communication medium.

4. The method of claim 2, wherein the boot trigger condition exists when a predetermined period has elapsed since the power supply supplied power on the communication medium.

5. The method of claim 1, wherein supplying power on the communication medium with the power supply operating at the first set point includes ramping up a nominal voltage of the power supply to a first voltage value and ramping up a power limit of the power supply to a first power limit value.

6. The method of claim 1, wherein the first set point is selected so as to supply enough power to cause a sink network element coupled to the communication medium to start up but not enough power to operate the network element normally.

7. The method of claim 6, wherein the first set point is selected so that power supplies one half the amount of power that is supplied when during normal operation of the sink network element.

8. The method of claim 1, wherein the second set point is selected so that the power supply supplies an amount of power needed to operate a sink network element coupled to the communication medium in a normal manner.

9. The method of claim 1, wherein supplying power on the communication medium with the power supply operating at the second set point includes ramping up a nominal voltage of the power supply to a second voltage value and ramping up a power limit of the power supply to a second power limit value.

10. The method of claim 1, further comprising determining if a ground fault exists and, if a ground fault exists, signaling a third alarm.

11. The method of claim 1, wherein the communication medium includes at least one twisted-pair telephone line.

12. The method of claim 1, further comprising dynamically adjusting the set point of the power supply.

13. The method of claim 12, further comprising monitoring a power-related attribute and adjusting the operation of the power supply based on the monitored power-related attribute.

14. A network element, comprising:
   a communication interface that produces a telecommunication service signal that includes traffic for a communication link;
   a power interface adapted to couple the network element to a power source, the power interface including a power supply that produces a power signal;
   a controller that controls the operation of the power supply; and
   a splitter that combines the telecommunication service signal with the power signal and applies the combined signal to the communication medium;
   wherein the controller:
      causes the power supply to supply power on the communication medium with the power supply operating at a first set point;
      determines if an overload condition exists while power is supplied on the communication medium with the power supply operating at the first set point;
      if the overload condition does not exist, signals a first alarm;
      if the overload condition exists, causes the power supply to supply power on the communication medium with the power supply operating at a second set point;
      determine if the overload condition continues to exist while the power supply supplies power on the communication medium with the power supply operating at the second set point; and
      if the overload condition continues to exist while the power supply supplies power on the communication medium with the power supply operating at the second set point, signal a second alarm.

15. The network element of claim 14, wherein the controller includes at least one of hardware and software.

16. The network element of claim 14, wherein the controller is included in the power interface.

17. The network element of claim 14, wherein the communications interface couples the network element to an upstream communication medium.

18. The network element of claim 14, wherein a digital subscriber line communication link is provided on the communication medium.

19. The network element of claim 14, wherein the network element is a central office terminal.

20. The network element of claim 14, wherein a voltage signal is provided between the controller and the power supply, wherein the voltage signal is used by the controller to set a nominal voltage at which the power supply is to supply power on the communication medium.

21. The network element of claim 14, wherein a power limit signal is provided between the controller and the power supply, wherein the power limit signal is used by the controller to set a power limit for the power supply, wherein the power limit is a maximum power the power supply is to provide on the communication medium.

22. The network element of claim 14, wherein an overload signal is provided by the power supply to the controller, wherein the overload signal is used by the power supply to inform the controller that an overload condition exists.

23. A network element, comprising:
   an interface adapted to couple the network element to a communication medium; and a power supply adapted to couple the network element to a power source;

wherein power is supplied on the communication medium with the power supply operating at a first set point;

wherein the network element determines if an overload condition exists while power is supplied on the communication medium with the power supply operating at the first set point;

wherein if the overload condition does not exist, the network element signals a first alarm;

wherein if the overload condition exists, the power supply supplies power on the communication medium with the power supply operating at a second set point;

wherein the network element determines if the overload condition continues to exist while the power supply supplies power on the communication medium with the power supply operating at the second set point; and wherein if the overload condition continues to exist while the power supply supplies power on the communication medium with the power supply operating at the second set point, the network element signals a second alarm.

24. The network element of claim 23, wherein a first communication link is provided on the communication medium.

25. The network element of claim 24, further comprising a communications interface that couples the network element to an upstream communication link and to the first communication link.

26. The network element of claim 23, wherein the communication medium includes a twisted-pair telephone line.

27. A network, comprising:
a source network element including a power supply coupled to a power source; and
a sink network element coupled to the source network element over a communication medium;
wherein power is supplied on the communication medium to power the sink network element with the power supply operating at a first set point;

wherein the network element determines if an overload condition exists while power is supplied on the communication medium with the power supply operating at the first set point;

wherein if the overload condition does not exist, the network element signals a first alarm;

wherein if the overload condition exists, the power supply supplies power on the communication medium to power the sink network element with the power supply operating at a second set point;

wherein the network element determines if the overload condition continues to exist while the power supply supplies power on the communication medium to power the sink network element with the power supply operating at the second set point; and wherein if the overload condition continues to exist while the power supply supplies power on the communication medium to power the sink network element with the power supply operating at the second set point, the network element signals a second alarm.

28. The network of claim 27, wherein the source network element is central office power plug.

29. The network of claim 27, wherein the sink network element is remote network element including a wireless access point.

30. The network of claim 27, further comprising a line interface unit coupled to the source network element.

31. The network of claim 27, further comprising a wireless services manager.

* * * * *